United States Patent
Matsuda et al.

(10) Patent No.: US 8,983,123 B2
(45) Date of Patent: Mar. 17, 2015

(54) TARGET-OBJECT DISTANCE MEASURING DEVICE AND VEHICLE MOUNTED WITH THE DEVICE

(75) Inventors: Kodai Matsuda, Saitama (JP); Nobuharu Nagaoka, Nasukarasuyama (JP); Makoto Aimura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 528 days.

(21) Appl. No.: 13/511,074

(22) PCT Filed: Oct. 18, 2010

(86) PCT No.: PCT/JP2010/068253
§ 371 (c)(1),
(2), (4) Date: May 21, 2012

(87) PCT Pub. No.: WO2011/065149
PCT Pub. Date: Jun. 3, 2011

(65) Prior Publication Data
US 2012/0281878 A1 Nov. 8, 2012

(30) Foreign Application Priority Data

Nov. 25, 2009 (JP) ................................ 2009-267793
Apr. 9, 2010 (JP) ................................ 2010-090407

(51) Int. Cl.
*G06K 9/00* (2006.01)
*G06T 7/00* (2006.01)
(Continued)

(52) U.S. Cl.
CPC ...... *G06T 7/0046* (2013.01); *G06T 2207/30196* (2013.01); *G06T 2207/30261* (2013.01); *G08G 1/16* (2013.01); *G06T 7/60* (2013.01)
USPC .......................................... 382/103; 382/106

(58) Field of Classification Search
CPC ......... G08G 1/16; G08G 1/161; G08G 1/162; G08G 1/163; G08G 1/166; G08G 1/167; G08G 1/168; G06T 2207/30196; G06T 2207/30261; G06T 7/0046; G06T 7/0048; G06T 7/60; G06K 9/00362; G06K 9/00369
See application file for complete search history.

(56) References Cited

U.S. PATENT DOCUMENTS

2003/0138133 A1* 7/2003 Nagaoka et al. .............. 382/104
2006/0115114 A1 6/2006 Nagaoka et al.
(Continued)

FOREIGN PATENT DOCUMENTS

JP H11-328364 * 11/1999 ................ G06T 1/00
JP 2006-172063 A 6/2006
(Continued)

OTHER PUBLICATIONS

"Report on the Investigation of Japanese Body Frames for drawing up dimension criteria for ready-to-wear (Measured from 1978 to 1981)", issued by Japanese Standards Association on Mar. 15, 1984, first edition, first printing.
(Continued)

*Primary Examiner* — Stephen R Koziol
*Assistant Examiner* — Timothy Choi
(74) *Attorney, Agent, or Firm* — Carrier Blackman & Associates, P.C.; Joseph P. Carrier; William D. Blackman

(57) ABSTRACT

In a target-object distance measuring device and a vehicle on which the device is mounted, a human body detection device is utilized for calculating a distance between an image capturing device and a human body candidate in an actual space based on the size of the human body candidate in the image. The head width is approximately 15-16 cm. A body height in the actual space of the human candidate in the image is estimated based on the ratio between the head-width in the extracted image and at least one size of the human body feature, such as total height, in the extracted human body candidate region, and the distance from the image capturing device to the human body candidate in the actual space is calculated based on the estimated body height in the actual space and the body height of the human body candidate in the image.

3 Claims, 15 Drawing Sheets

(51) Int. Cl.
*G06T 7/60* (2006.01)
*G08G 1/16* (2006.01)

(56) References Cited

U.S. PATENT DOCUMENTS

2006/0126896 A1\* 6/2006 Nagaoka et al. .............. 382/103
2007/0171033 A1 7/2007 Nagaoka et al.
2008/0260207 A1\* 10/2008 Nagaoka et al. .............. 382/103

FOREIGN PATENT DOCUMENTS

JP 2007-213561 A 8/2007
JP 3970876 B2 9/2007
WO 2009/064227 A1 5/2009

OTHER PUBLICATIONS

"Measured Data of Japanese Human Bodies, Japanese body size data Measured from 1992-1994", issued by Research Institute of Human Engineering for Quality Life in Oct. 1997.

\* cited by examiner

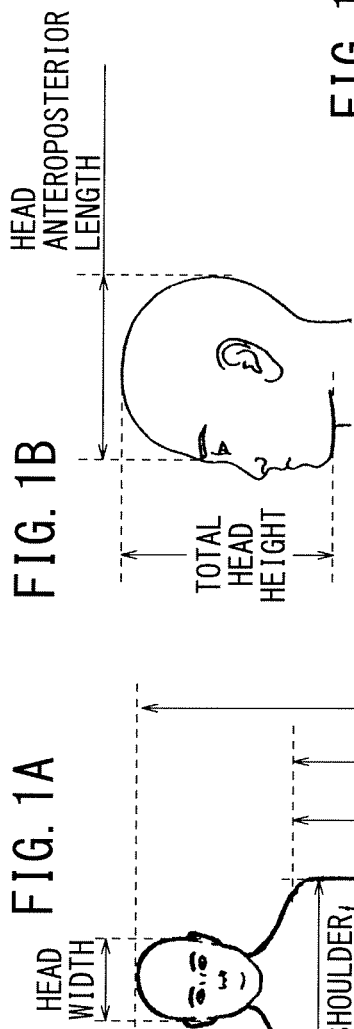
FIG. 1A
FIG. 1B
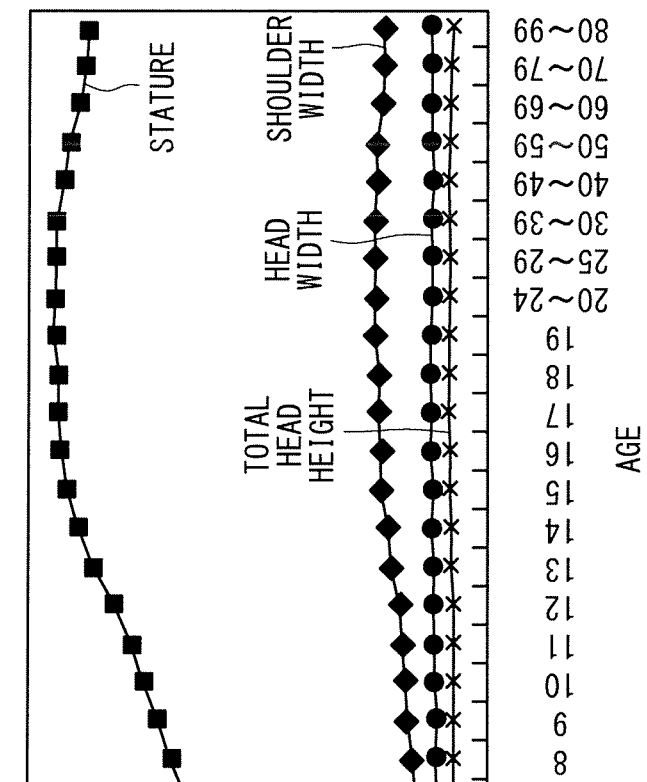
FIG. 1C

FIG. 2

| AGE | | STATURE | SITTING HEIGHT | SHOULDER HEIGHT | UPPER LIMB LENGTH | INSIDE LEG LENGTH | SHOULDER WIDTH | TOTAL HEAD HEIGHT | HEAD WIDTH | UNIT[cm] HEAD ANTEROPOSTERIOR LENGTH |
|---|---|---|---|---|---|---|---|---|---|---|
| 7 | AVERAGE VALUE | 119.3 | 65.5 | 93.2 | 50.5 | 51.3 | 29.4 | 20.7 | 14.9 | 17.3 |
| 8 | AVERAGE VALUE | 124.6 | 67.7 | 98.0 | 52.9 | 54.6 | 30.7 | 21.0 | 15.0 | 17.3 |
| 9 | AVERAGE VALUE | 130.3 | 70.2 | 103.1 | 55.5 | 57.8 | 32.3 | 21.4 | 15.2 | 17.4 |
| 10 | AVERAGE VALUE | 135.8 | 72.4 | 108.2 | 58.1 | 61.2 | 33.7 | 21.8 | 15.3 | 17.6 |
| 11 | AVERAGE VALUE | 140.6 | 74.5 | 112.3 | 60.4 | 64.0 | 35.0 | 22.0 | 15.3 | 17.7 |
| 12 | AVERAGE VALUE | 147.3 | 77.3 | 118.3 | 63.4 | 67.7 | 36.4 | 22.3 | 15.4 | 17.8 |
| 13 | AVERAGE VALUE | 155.2 | 81.5 | 125.3 | 67.1 | 70.8 | 38.6 | 22.7 | 15.6 | 18.1 |
| 14 | AVERAGE VALUE | 161.0 | 84.5 | 130.2 | 69.7 | 73.3 | 40.3 | 23.1 | 15.7 | 18.2 |
| 15 | AVERAGE VALUE | 165.6 | 87.4 | 134.3 | 71.7 | 73.3 | 42.3 | 23.5 | 15.8 | 18.4 |
| 16 | AVERAGE VALUE | 168.7 | 89.4 | 137.2 | 73.0 | 75.2 | 43.1 | 23.8 | 15.9 | 18.6 |
| 17 | AVERAGE VALUE | 169.1 | 90.1 | 137.4 | 72.9 | 76.3 | 43.7 | 23.9 | 15.9 | 18.7 |
| 18 | AVERAGE VALUE | 169.3 | 90.3 | 137.8 | 72.9 | 76.0 | 44.1 | 23.9 | 15.9 | 18.8 |
| 19 | AVERAGE VALUE | 170.2 | 90.8 | 138.3 | 73.1 | 76.0 | 45.0 | 23.8 | 15.9 | 18.8 |
| 20~24 | AVERAGE VALUE | 170.5 | 91.3 | 138.7 | 72.8 | 76.0 | 45.0 | 23.7 | 16.0 | 18.8 |
| 25~29 | AVERAGE VALUE | 170.6 | 91.5 | 138.5 | 72.7 | 76.0 | 45.4 | 23.6 | 16.1 | 18.8 |
| 30~39 | AVERAGE VALUE | 169.5 | 91.3 | 137.8 | 72.2 | 75.0 | 45.3 | 23.5 | 16.1 | 18.7 |
| 40~49 | AVERAGE VALUE | 167.3 | 90.5 | 136.3 | 71.2 | 73.4 | 44.8 | 23.3 | 16.0 | 18.8 |
| 50~59 | AVERAGE VALUE | 164.8 | 89.4 | 134.1 | 70.4 | 71.7 | 44.0 | 23.3 | 16.0 | 18.7 |
| 60~69 | AVERAGE VALUE | 161.2 | 87.0 | 131.4 | 69.8 | 70.3 | 42.7 | 23.1 | 15.7 | 18.6 |
| 70~79 | AVERAGE VALUE | 158.6 | 85.2 | 129.3 | 69.1 | 68.9 | 41.7 | 22.9 | 15.5 | 18.7 |
| 80~99 | AVERAGE VALUE | 157.1 | 84.0 | 127.9 | 69.2 | 68.5 | 41.2 | 22.9 | 15.4 | 18.7 |

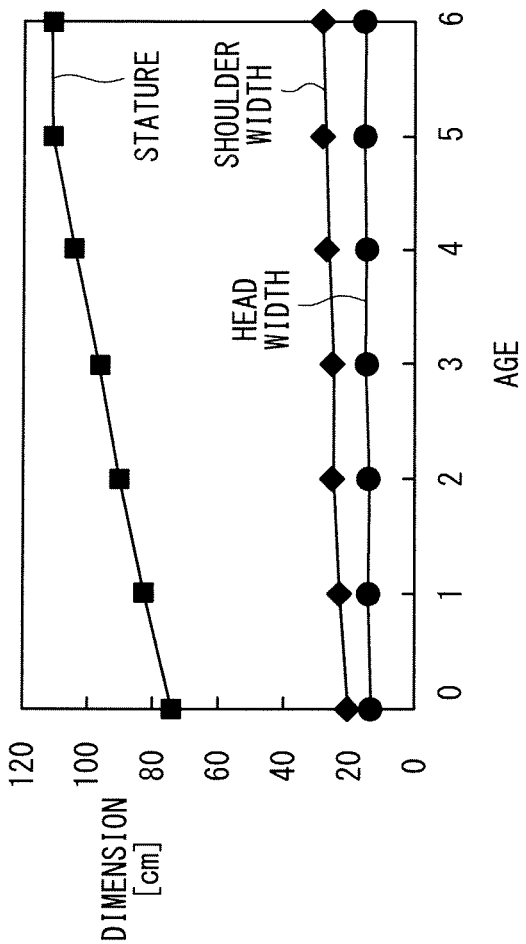
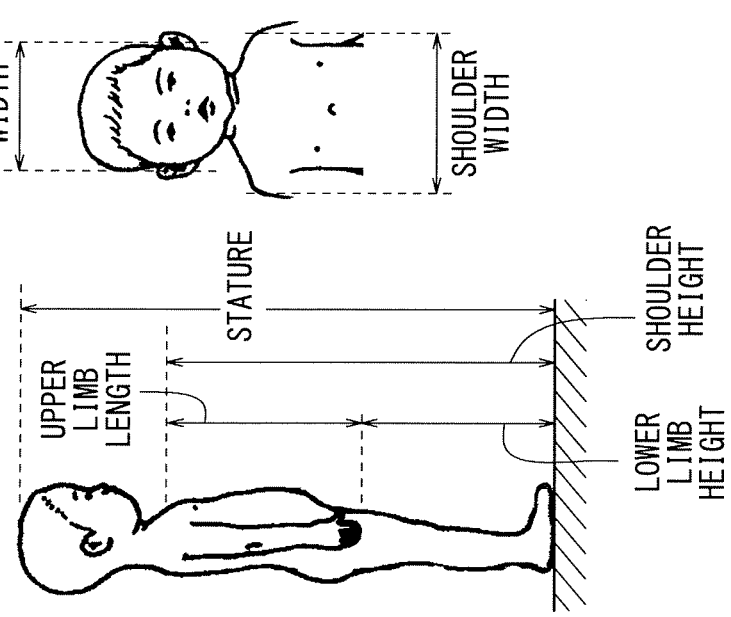

FIG. 4

UNIT [cm]

| AGE | | STATURE | SITTING HEIGHT | SHOULDER HEIGHT | UPPER LIMB LENGTH | INSIDE LEG LENGTH | SHOULDER WIDTH | TOTAL HEAD HEIGHT | HEAD WIDTH | HEAD ANTEROPOSTERIOR LENGTH |
|---|---|---|---|---|---|---|---|---|---|---|
| 0 | AVERAGE VALUE | 73.8 | 45.3 | 53.7 | 29.7 | 26.0 | 20.1 | NO DATA | 13.4 | NO DATA |
| | STANDARD DEVIATION | 1.7 | 2.1 | 2.7 | 1.2 | 2.7 | 0.6 | NO DATA | 0.6 | NO DATA |
| 1 | AVERAGE VALUE | 81.9 | 48.0 | 61.3 | 33.3 | 29.1 | 22.5 | NO DATA | 14.0 | NO DATA |
| | STANDARD DEVIATION | 0.9 | 2.2 | 1.7 | 0.7 | 1.5 | 0.5 | NO DATA | 0.3 | NO DATA |
| 2 | AVERAGE VALUE | 90.7 | 53.6 | 68.3 | 37.1 | 35.3 | 24.3 | NO DATA | 14.0 | NO DATA |
| | STANDARD DEVIATION | 3.8 | 2.1 | 3.2 | 2.6 | 1.9 | 1.6 | NO DATA | 0.8 | NO DATA |
| 3 | AVERAGE VALUE | 97.1 | 56.0 | 73.6 | 39.3 | 39.6 | 24.5 | NO DATA | 15.2 | NO DATA |
| | STANDARD DEVIATION | 2.5 | 1.8 | 1.9 | 1.7 | 2.3 | 0.9 | NO DATA | 0.6 | NO DATA |
| 4 | AVERAGE VALUE | 104.8 | 59.8 | 80.2 | 44.0 | 43.5 | 26.1 | NO DATA | 14.7 | NO DATA |
| | STANDARD DEVIATION | 3.3 | 2.0 | 3.3 | 2.1 | 2.2 | 1.6 | NO DATA | 0.6 | NO DATA |
| 5 | AVERAGE VALUE | 110.9 | 62.2 | 84.2 | 45.7 | 46.2 | 26.8 | NO DATA | 15.0 | NO DATA |
| | STANDARD DEVIATION | 2.9 | 2.2 | 3.3 | 1.6 | 2.5 | 1.2 | NO DATA | 0.7 | NO DATA |
| 6 | AVERAGE VALUE | 112.9 | 63.9 | 87.5 | 47.7 | 48.1 | 27.6 | NO DATA | 15.0 | NO DATA |
| | STANDARD DEVIATION | 3.8 | 2.0 | 3.2 | 2.3 | 2.6 | 1.2 | NO DATA | 0.7 | NO DATA |

FIG. 7

| AGE | STATURE HT | HEAD WIDTH | RATIO R (STATURE/HEAD WIDTH) |
|---|---|---|---|
| 0 | 73.8 | 13.4 | 5.507462687 |
| 1 | 81.9 | 14.0 | 5.85 |
| 2 | 90.7 | 14.0 | 6.478571429 |
| 3 | 97.1 | 15.2 | 6.388157895 |
| 4 | 104.8 | 14.7 | 7.129251701 |
| 5 | 110.9 | 15.0 | 7.393333333 |
| 6 | 112.9 | 15.0 | 7.526666667 |
| 7 | 119.3 | 14.9 | 8.001341382 |
| 8 | 124.6 | 15.0 | 8.284574468 |
| 9 | 130.3 | 15.2 | 8.589321028 |
| 10 | 135.8 | 15.3 | 8.887434555 |
| 11 | 140.6 | 15.3 | 9.177545692 |
| 12 | 147.3 | 15.4 | 9.552529183 |
| 13 | 155.2 | 15.6 | 9.923273657 |
| 14 | 161.0 | 15.7 | 10.26131294 |
| 15 | 165.6 | 15.8 | 10.46114972 |
| 16 | 168.7 | 15.9 | 10.63011972 |
| 17 | 169.1 | 15.9 | 10.63011972 |
| 18 | 169.3 | 15.9 | 10.66876972 |
| 19 | 170.2 | 15.9 | 10.70440252 |
| 20~24 | 170.5 | 16.0 | 10.62967581 |
| 25~29 | 170.6 | 16.1 | 10.60285892 |
| 30~39 | 169.5 | 16.1 | 10.52141527 |
| 40~49 | 167.3 | 16.0 | 10.46278924 |
| 50~59 | 164.8 | 16.0 | 10.31289111 |
| 60~69 | 161.2 | 15.7 | 10.30031949 |
| 70~79 | 158.6 | 15.5 | 10.23886378 |
| 80~99 | 157.1 | 15.4 | 10.18146468 |

| AGE | STATURE HT | SHOULDER WIDTH | RATIO R' (SHOULDER WIDTH/STATURE) |
|---|---|---|---|
| 0 | 73.8 | 20.1 | 0.272357724 |
| 1 | 81.9 | 22.5 | 0.274725275 |
| 2 | 90.7 | 24.3 | 0.267916207 |
| 3 | 97.1 | 24.5 | 0.252317199 |
| 4 | 104.8 | 26.1 | 0.249045802 |
| 5 | 110.9 | 26.8 | 0.241659152 |
| 6 | 112.9 | 27.6 | 0.244464128 |
| 7 | 119.3 | 29.4 | 0.246437552 |
| 8 | 124.6 | 30.7 | 0.246388443 |
| 9 | 130.3 | 32.3 | 0.247889486 |
| 10 | 135.8 | 33.7 | 0.248159057 |
| 11 | 140.6 | 35.0 | 0.248933144 |
| 12 | 147.3 | 36.4 | 0.247114732 |
| 13 | 155.2 | 38.6 | 0.24871134 |
| 14 | 161.0 | 40.3 | 0.250310559 |
| 15 | 165.6 | 42.3 | 0.255434783 |
| 16 | 168.7 | 43.1 | 0.255483106 |
| 17 | 169.1 | 43.7 | 0.258426966 |
| 18 | 169.3 | 44.1 | 0.260484347 |
| 19 | 170.2 | 45.0 | 0.26439483 |
| 20~24 | 170.5 | 45.0 | 0.263929619 |
| 25~29 | 170.6 | 45.4 | 0.266119578 |
| 30~39 | 169.5 | 45.3 | 0.267256637 |
| 40~49 | 167.3 | 44.8 | 0.267782427 |
| 50~59 | 164.8 | 44.0 | 0.266990291 |
| 60~69 | 161.2 | 42.7 | 0.264888337 |
| 70~79 | 158.6 | 41.7 | 0.262925599 |
| 80~99 | 157.1 | 41.2 | 0.262253342 |

80

TARGET-OBJECT DISTANCE MEASURING DEVICE AND VEHICLE MOUNTED WITH THE DEVICE

TECHNICAL FIELD

The present invention relates to a target object distance measuring apparatus (device), which includes a human body detector for detecting a human body based on an image acquired by an image capturing device. The present invention also relates to a vehicle incorporating such a target object distance measuring apparatus therein (a vehicle mounted with the device).

BACKGROUND ART

Vehicle periphery monitoring apparatus including a human body detector according to the background art extract information concerning a target object, such as a pedestrian or the like, who might possibly come into contact with the vehicle, which incorporates the apparatus therein, from images around the vehicle that are captured by two infrared cameras. The extracted information is presented to the driver of the vehicle.

Such a vehicle periphery monitoring apparatus detects, as a target object, a high-temperature area in images around the vehicle, which are captured by a pair of left and right infrared cameras (stereoscopic cameras), calculates the distance up to the target object by determining parallax between objects in the left and right images, detects a target object that could affect the travel of the vehicle from the direction in which the target object moves and the position of the target object, and outputs a warning (see Japanese Patent No. 3970876).

Japanese Patent No. 3970876 discloses a technique for detecting a head candidate for a target object, and for deciding whether or not the target object is a human body or a man-made structure, by determining whether the detected head candidate is larger than the lateral width of a human head (head width).

Detecting the distance between the installed positions of the two cameras and the target object based on parallax, as disclosed in Japanese Patent No. 3970876, is disadvantageous in that costs are increased because of the two installed cameras. Further, such a technique requires a complicated installation process including strict adjustment of optical axes of the cameras.

Another technique for eliminating the above disadvantages is disclosed in Japanese Laid-Open Patent Publication No. 2007-213561. According to the technique disclosed in Japanese Laid-Open Patent Publication No. 2007-213561, a single infrared camera, which is installed on a vehicle, is used to capture at least two images (two frames) of a target object near the vehicle within a certain time interval. A change in the size of a present image of the target object from the size of a previous image becomes greater as the relative speed between the target object and the vehicle, which incorporates a vehicle periphery monitoring apparatus therein, becomes higher. A target object, which is present in front of the vehicle, reaches the vehicle in a shorter time as the relative speed between the target object and the vehicle becomes higher.

Consequently, it is possible to monitor the periphery of the vehicle by estimating the time in which a target object reaches the vehicle, from the rate of change of the size of the target object in images that are captured within a given time interval.

According to the technique disclosed in Japanese Laid-Open Patent Publication No. 2007-213561, since a single infrared camera is used, the cost of the apparatus is lower than if two cameras are used, and therefore the apparatus can be installed on a vehicle at a reduced cost.

Documents according to the background art, which are relevant to the present invention, include Document 1, "Report on the Investigation of Japanese Body Frames, Measured from 1978 to 1981," Ministry of Economy, Trade and Industry (Ministry of International Trade and Industry), Agency of Industrial Science and Technology, Japanese Standards Association (1984), and Document 2, "Measured Data of Japanese Human Bodies, Measured from 1992 to 1994," Research Institute of Human Engineering for Quality Life (HQL).

SUMMARY OF INVENTION

The vehicle periphery monitoring apparatus disclosed in Japanese Patent No. 3970876 and Japanese Laid-Open Patent Publication No. 2007-213561 are capable of displaying an image of a pedestrian in front of the vehicle, which is detected as a target object, and which would be hard for the driver to see visually when the vehicle is driving at night.

As shown in FIG. 15, if it is assumed that the stature Hc in real space of a human body candidate 2, which is present in real space as a target object, is about 170 cm, for example, which is the average stature of Japanese adults, then the distance in real space from the position of a camera 3, i.e., the position from a vehicle to the human body candidate 2 in real space as the target object, can be calculated as a calculated distance value Zc according to the following equation (1):

$$Zc = Hc \times F/h = 170 \text{ [cm]} \times F/h \qquad (1)$$

where F represents the focal length of the camera 3, which is fixedly mounted on a front portion of the vehicle, and h represents the stature of a human body candidate 4 in the image.

If a true human body 5 in real space of the human body candidate 2 is taller or shorter than the human body candidate 2, then as shown in FIG. 15, the stature Hc as an assumed value has an error ΔH with respect to the true stature Htrue of the true human body 5. In this case, a distance error ΔZ (measurement error) occurs, as indicated by the following equation (2):

$$\Delta Z = F \times \Delta H/h \qquad (2)$$

As disclosed in Japanese Laid-Open Patent Publication No. 2007-213561, a process is known for determining a rate of enlargement (rate of change over time) of a target object from two frame images captured at different times, and then determining the distance up to the target object based on the rate of enlargement. However, the process is problematic in that a certain amount of time is required to calculate the distance.

The present invention has been made in view of the above problems. It is an object of the present invention to provide a target object distance measuring apparatus, which is capable of more accurately calculating the distance from an image capturing device to a human body candidate in real space (the true human body 5 in real space, which corresponds to the human body candidate 2 in the image), based on the size of the human body candidate in the image. A further object of the present invention is to provide a vehicle incorporating such a target object distance measuring apparatus therein.

According to the present invention, there is provided a target object distance measuring apparatus including a human body detector for detecting a human body based on an image acquired by an image capturing device. The target object distance measuring apparatus comprises a human body candidate area extractor for extracting a human body candidate area from the image, a reference feature extractor for extracting, as a reference feature from the extracted human body candidate area, a predetermined one of human features including a total height, a total width, a torso, an arm, a leg, and a head, a comparison feature extractor for extracting, as a comparison feature from the extracted human body candidate area, one of the human features including the total height, the total width, the torso, the arm, the leg, and the head, except for the reference feature, a size-in-real-space estimator for estimating the size in real space of a human body candidate in the image, based on a ratio of the size of the reference feature and the size of the comparison feature, and a distance calculator for calculating the distance from the image capturing device to the human body candidate in the real space, based on the estimated size in the real space of the human body candidate and the size of the human body candidate in the image.

According to the present invention, the human body candidate area extractor extracts a human body candidate area from an image acquired by the image capturing device, and the reference feature extractor extracts, as a reference feature from the extracted human body candidate area, a predetermined one of human features including a total height, a total width, a torso, an arm, a leg, and a head. The comparison feature extractor extracts, as a comparison feature from the extracted human body candidate area, one of the human features including the total height, the total width, the torso, the arm, the leg, and the head, except for the reference feature. The size-in-real-space estimator estimates the size in real space of a human body candidate in the image, based on the ratio of the size of the reference feature and the size of the comparison feature. The distance calculator calculates the distance from the image capturing device to the human body candidate in real space, based on the size in real space of the human body candidate, which is estimated by the size-in-real-space estimator, and the size of the human body candidate in the image.

Therefore, the distance up to the human candidate in real space can be calculated accurately in a short period of time with a simple arrangement.

As an example of the reference feature, a Japanese head size (e.g., head width) is substantially constant in the range from about 15 cm to 16 cm for people who range from 3 years of age to 99 years of age, i.e., is of a fixed value regardless of age, as can be seen from the Japanese body frame data shown in FIGS. 1A, 1B, 1C and 2, which represent figures shown in Document 1, "Report on the Investigation of Japanese Body Frames, Measured from 1978 to 1981," Ministry of Economy, Trade and Industry (Ministry of International Trade and Industry), Agency of Industrial Science and Technology, Japanese Standards Association (1984), and infant body frame data shown in FIGS. 3A, 3B, 3C and 4, which represent figures shown in Document 2, "Measured Data of Japanese Human Bodies, Measured from 1992 to 1994," Research Institute of Human Engineering for Quality Life (HQL). Based on the above findings, the size-in-real-space estimator can accurately estimate the size in real space of a human body candidate in the image, based on the ratio of the size of the head in the image, which is extracted by the reference feature extractor (which functions as a head extractor), and the size of at least one of the total height, the total width, the torso, the arm, and the leg, which change with age, from the human body candidate area, which is extracted by the comparison feature extractor. The distance calculator then can accurately calculate the distance from the image capturing device to the human body candidate in real space, based on the estimated size in real space of the human body candidate and the size of the human body candidate in the image.

As another example of a reference feature, a Japanese shoulder size, e.g., shoulder width (also referred to as total width), generally increases monotonously with age, as can be seen from Japanese body frame data shown in FIGS. 1A, 1B, 1C and 2, which represent figures shown in Document 1, "Report on the Investigation of Japanese Body Frames, Measured from 1978 to 1981," Ministry of Economy, Trade and Industry (Ministry of International Trade and Industry), Agency of Industrial Science and Technology, Japanese Standards Association (1984), and infant body frame data shown in FIGS. 3A, 3B, 3C and 4, which represent figures shown in Document 2, "Measured Data of Japanese Human Bodies, Measured from 1992 to 1994," Research Institute of Human Engineering for Quality Life (HQL). Based on the above findings, the size-in-real-space estimator can accurately estimate the size in real space of a human body candidate in the image for people who range generally from 5 years of age to 99 years of age, based on the ratio of the shoulder width in the image, which is extracted by the reference feature extractor while functioning as a total width (shoulder width) extractor, and the size of at least one of the human body features including the total height, the total width, the torso, the arm, and the leg, which change with age, from the human body candidate area, which is extracted by the comparison feature extractor (in the present embodiment, shoulder width/stature is used). The distance calculator then can accurately calculate the distance from the image capturing device to the human body candidate in real space, based on the estimated size in real space of the human body candidate and the size of the human body candidate in the image.

According to the present invention, since the distance can be calculated when a single image (frame) is captured, the distance can be calculated in a shorter period of time than is possible with the technique disclosed in Japanese Laid-Open Patent Publication No. 2007-213561, which calculates the distance when two images (two frames) are captured. Furthermore, inasmuch as the distance can be calculated using a single image capturing apparatus, costs can be reduced, similar to the technique disclosed in Japanese Laid-Open Patent Publication No. 2007-213561.

The present invention also concerns a vehicle incorporating therein the target object distance measuring apparatus, which includes the above human body detector, and wherein the vehicle includes a notifying unit for notifying the driver when the human body detector detects a human body.

According to the present invention, the distance up to the human candidate in real space can be calculated accurately in a short period of time with a simple arrangement.

BRIEF DESCRIPTION OF DRAWINGS

FIG. 1A is a diagram showing human body features of a person who is 7 years of age or older;

FIG. 1B is a diagram showing the head anteroposterior length and total head height of a person who is 7 years of age or older;

FIG. 1C is a graph showing body frame data representing stature, shoulder width, head width, and total head height, of people who range from 7 years of age to 99 years of age;

FIG. 2 is a table showing Japanese body frame data, based on which the graph of body frame data shown in FIG. 1C is plotted;

FIG. 3A is a diagram showing human body features of an infant who is 6 years of age or younger;

FIG. 3B is a diagram showing head width and shoulder width of an infant who is 6 years of age or younger;

FIG. 3C is a graph showing measured human body values of infants, representing stature, shoulder width, and head width, of infants who range from 0 years of age to 6 years of age;

FIG. 4 is a table showing infant data, based on which the graph of measured human body values shown in FIG. 3C is plotted;

FIG. 7 is a table showing average value data of stature and head width of people ranging from 0 years of age to 99 years of age;

FIG. 12 is a table showing average value data of stature and head width of people ranging from 0 years of age to 99 years of age;

DESCRIPTION OF EMBODIMENTS

Embodiments of the present invention will be described below with reference to the drawings.

Overall Configuration

Figure 5:
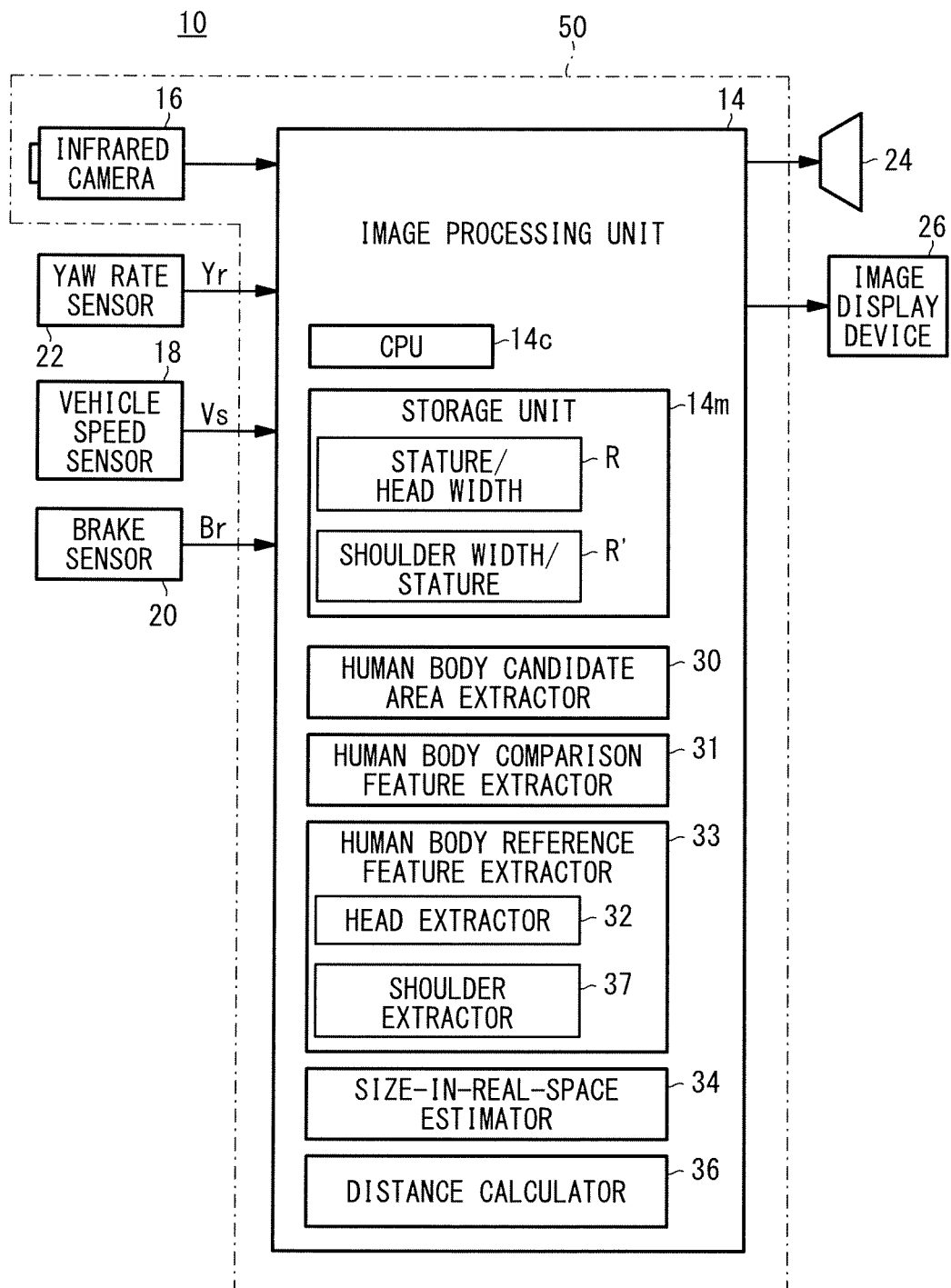
FIG. 5 is a block diagram showing a configuration of a vehicle periphery monitoring apparatus, which incorporates therein a target object distance measuring apparatus including a human body detector according to an embodiment of the present invention.
Figure 6:
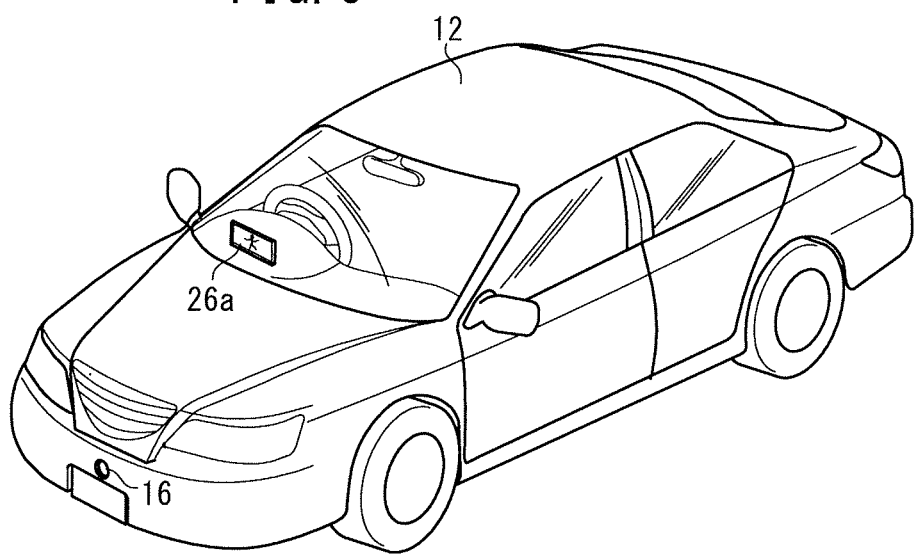
FIG. 6 is a schematic view of a vehicle, which includes the vehicle periphery monitoring apparatus incorporating therein the target object distance measuring apparatus including the human body detector shown in FIG. 5.

FIG. 5 is a block diagram showing an overall configuration of a vehicle periphery monitoring apparatus 10, which incorporates therein a target object distance measuring apparatus 50 including a human body detector according to an embodiment of the present invention. FIG. 6 is a schematic view of a vehicle 12, which includes the vehicle periphery monitoring apparatus 10 incorporating therein the target object distance measuring apparatus 50 including the human body detector shown in FIG. 5.

As shown in FIGS. 5 and 6, the vehicle periphery monitoring apparatus 10 includes an image processing unit 14 (processor) for controlling the vehicle periphery monitoring apparatus 10 and the target object distance measuring apparatus 50, an infrared camera 16 (image capturing device) connected to the image processing unit 14, a vehicle speed sensor 18 for detecting a vehicle speed Vs of the vehicle 12, a brake sensor 20 for detecting a manipulative variable Br applied to a brake pedal of the vehicle by the driver of the vehicle (brake manipulative variable), a yaw rate sensor 22 for detecting a yaw rate Yr of the vehicle 12, a speaker 24 (notifying unit) for issuing a voice (speech) warning or the like, and an image display device 26 (notifying unit) such as an HUD (head-up display) 26a for displaying an image captured by the infrared camera 16, so as to enable the driver of the vehicle to recognize a target object (moving target object), such as a pedestrian or the like, who is highly likely to come into contact with the vehicle.

The image display device 26 is not limited to the HUD 26a. Alternatively, the image display device 26 may be the display of a navigation system.

The image processing unit 14 detects a moving object, such as a pedestrian or the like in front of the vehicle, from an infrared image of the periphery of the vehicle 12, and signals (i.e., vehicle speed Vs, the brake manipulative variable Br, and yaw rate Yr), which are indicative of the running state of the vehicle 12. When the image processing unit 14 determines that it is highly likely for the detected object to come into contact with the vehicle 12, a warning is issued through the speaker 24.

The image processing unit 14 includes an A/D converting circuit for converting input analog signals into digital signals, an image memory (storage unit 14m) for storing digital image signals, a CPU (central processing unit) 14c for performing various processing operations, a storage unit 14m including a RAM (random access memory), which is used to store data produced while the CPU 14c is performing processing operations, and a ROM (read only memory) for storing programs executed by the CPU 14c, tables, maps, etc., and an output circuit for outputting drive signals for the speaker 24 and display signals for the image display device 26. Output signals from the infrared camera 16, the yaw rate sensor 22, the vehicle speed sensor 18, and the brake sensor 20 are converted into digital signals, which are input to the CPU 14c.

The CPU 14c of the image processing unit 14 reads the digital signals and executes programs, thereby functioning as various functional units (also referred to as functional means) for sending drive signals for warnings (voice signals and display signals) to the speaker 24 and the image display device 26.

According to the present embodiment, the CPU 14c functions as a human body candidate area extractor 30, a human body comparison feature extractor 31, a human body reference feature extractor 33, a size-in-real-space estimator 34, and a distance calculator 36. The human body reference feature extractor 33 includes a head extractor 32 and a shoulder extractor 37. As described later, the head extractor 32 is used in the first inventive example, and the shoulder extractor 37 is used in the second inventive example.

The image processing unit 14 and the infrared camera 16 jointly make up the target object distance measuring apparatus 50 according to the present embodiment. Instead of the infrared camera 16, an ordinary video camera may be used.

As shown in FIG. 6, the infrared camera 16, which detects far infrared rays, is disposed on a front bumper in a central position along the widthwise direction of the vehicle 12. The infrared camera 16 has characteristics such that the output signal level thereof is higher (luminance is higher) as the temperature of the target object becomes higher.

The HUD 26a has a display screen disposed on the front windshield of the vehicle 12, at a position that does not impede the forward field of vision of the driver.

According to the present embodiment, the storage unit 14m preliminarily stores as characteristics (map or calculation formula) in terms of the body frame of pedestrians as human bodies, a ratio R of a region, which changes to a smaller extent as the human body grows (referred to as a "human body reference feature" in the first inventive example), and a region, which changes to a greater extent as the human body grows (referred to as a "human body comparison feature" in the first inventive example). In the first inventive example of the present embodiment, attention is focused on head width as a region that changes to a smaller extent as the human body grows, and stature as a region that changes to a greater extent as the human body grows. The ratio=stature/head width is calculated as the ratio R and is stored in the storage unit 14m. The storage unit 14m may alternatively store a calculation formula for the ratio R (R=stature/head width) therein.

The human body reference feature and the human body comparison feature are given by way of illustrative example to facilitate understanding of the present invention. Head width may be defined as a human body comparison feature, and stature may be defined as a human body reference feature.

In the second example, to be described later, the storage unit 14m preliminarily stores as characteristics a ratio R' of regions that change at different rates as the human body grows. In the second example, shoulder width is defined as a human body reference feature, and stature is defined as a human body comparison feature. The ratio R'=(shoulder width/stature) is stored in the storage unit 14m.

FIG. 7 is a table representative of a map (table) 60 of calculated ratios R (average stature values/average head width values) based on age according to the first inventive example, statures HT (average values), and head widths (average values), which are extracted from the Japanese body frame data shown in FIGS. 1A, 1B, 1C and 2, and the infant body frame data shown in FIGS. 3A, 3B, 3C and 4.

Figure 8:
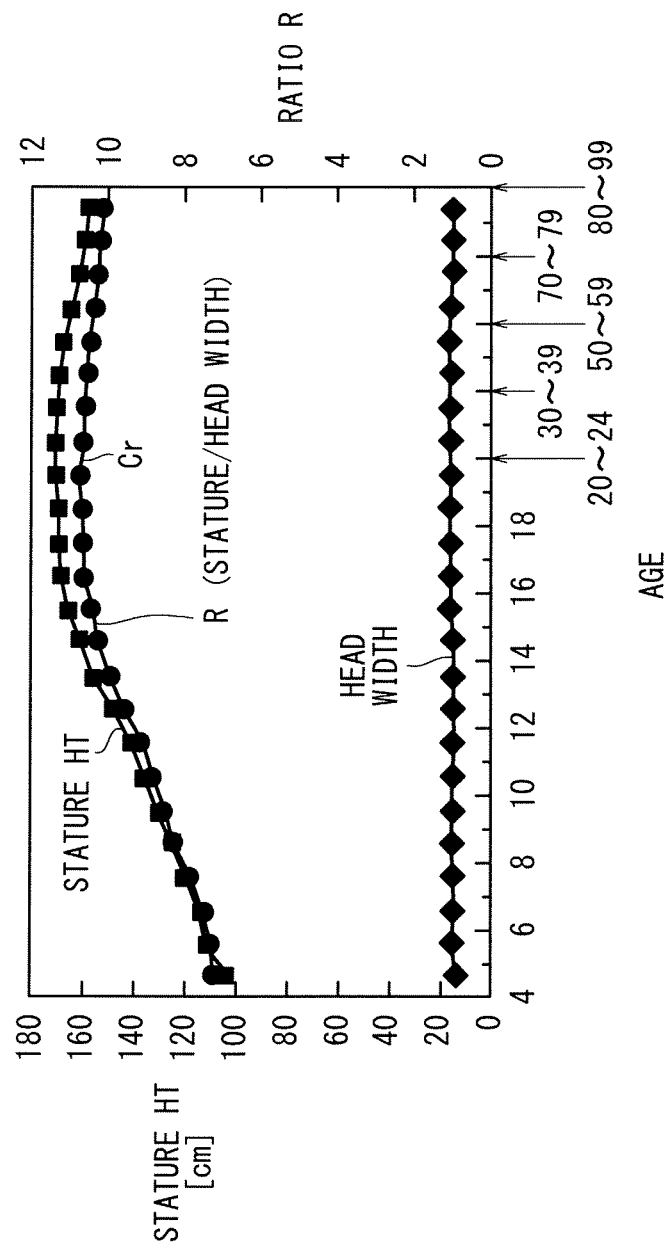
FIG. 8 is a graph showing stature, head width, and the ratio (stature/head width) thereof, of people ranging from 4 years of age to 99 years of age.

FIG. 8 is a graph showing stature, head width, and the ratio R (stature/head width) thereof according to the first inventive example, which are plotted for people ranging from 4 years of age to 99 years of age. It should be noted in particular that head width remains essentially constant regardless of changes in stature, and characteristics Cr of the ratio R (stature/head width) change generally in proportion to stature.

Operations of the present embodiment will be described below with reference to the drawings, in order of the "first inventive example" and the "second inventive example".

First Inventive Example

Figure 9:
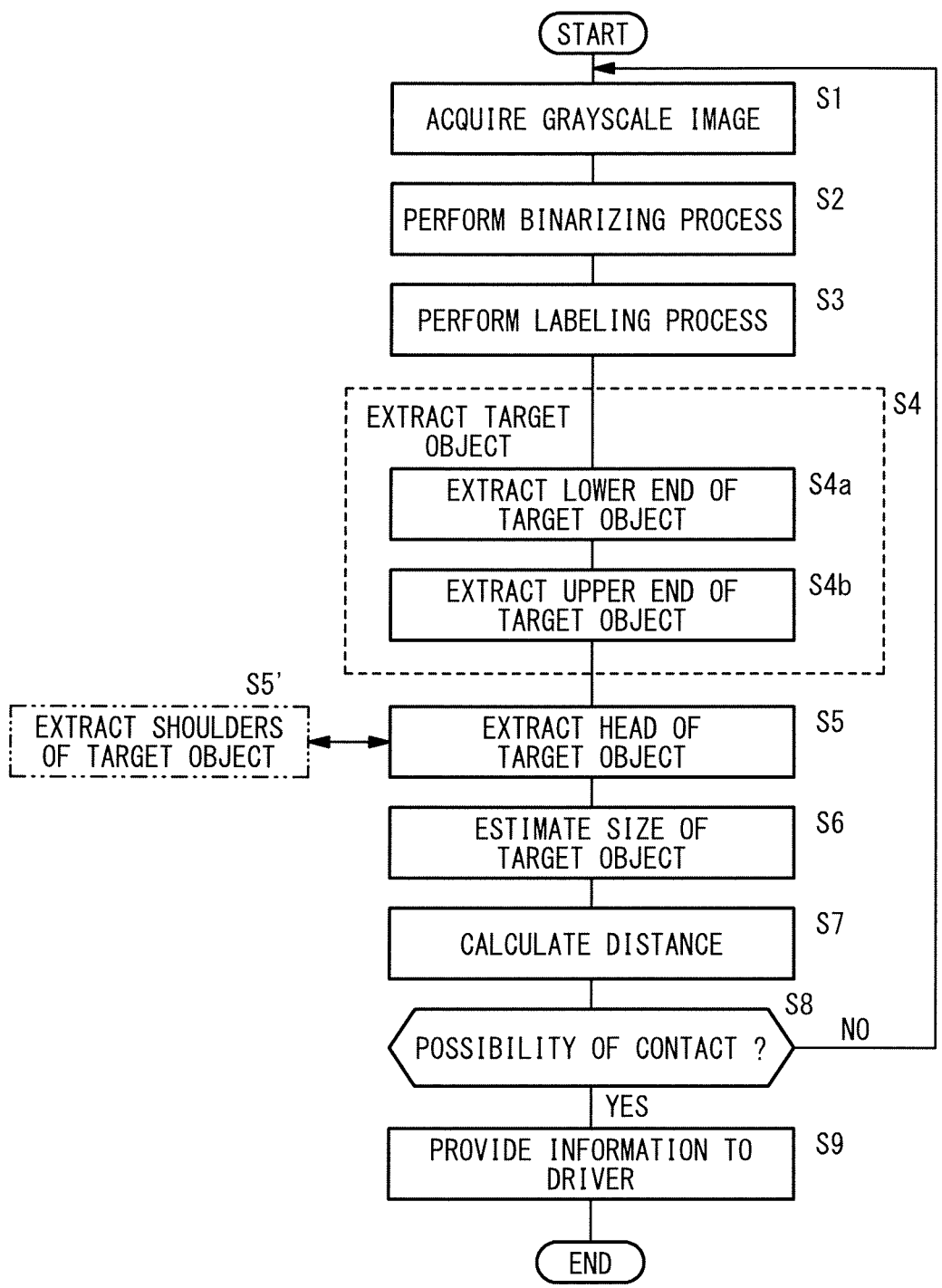
FIG. 9 is a flowchart of an operation sequence of the embodiment.

FIG. 9 is a flowchart of an operation sequence of the image processing unit 14, which detects a target object such as a pedestrian or the like, estimates the size of the target object, and calculates the distance up to the target object.

In step S1 shown in FIG. 9, the image processing unit 14 acquires infrared images represented by output signals from the infrared camera 16 in respective frames captured within a given angle of view in front of the vehicle, converts the acquired infrared images into digital images, and stores the digital images as grayscale images in the image memory of the storage unit 14m.

When the grayscale images have been produced, the image processing unit 14 then performs a binarizing process on the image signals of the grayscale images in step S2. More specifically, the image processing unit 14 converts areas, which are brighter than a luminance threshold value for determining human body luminance levels, into a value "1" (white), and areas, which are darker than the luminance threshold value, into a value "0" (black), so as to obtain binarized images corresponding to the grayscale images for the respective captured frames. The image processing unit 14 stores the binarized images in the storage unit 14m.

Figure 10:
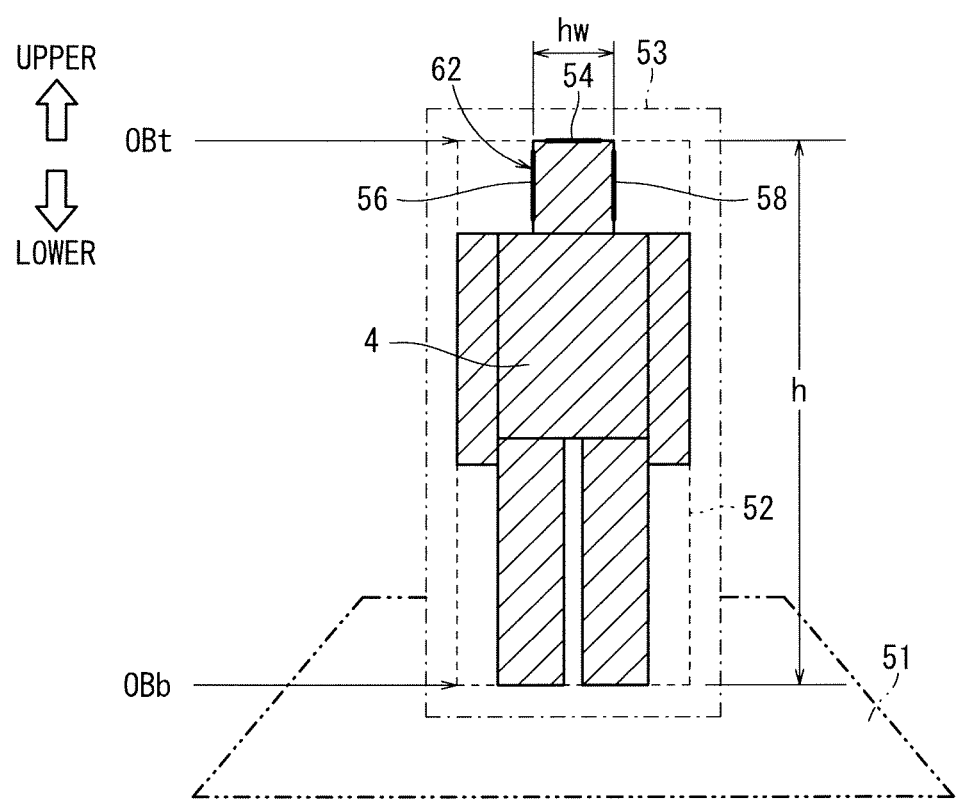
FIG. 10 is a diagram of an image used in describing an operation sequence according to a first inventive example.

Then, in step S3, the human body candidate area extractor 30 performs a labeling process. More specifically, the human body candidate area extractor 30 converts the value "1" (white) in the binarized images into run-length data for each scanning line along an x-direction (horizontal direction), regards lines having portions overlapping in a y-direction as one target object, and labels a quadrangle around the target object as a human body candidate area 52, as shown in FIG. 10.

In step S4, the target object is extracted. More specifically, in step S4a, the human body comparison feature extractor 31 scans a mask area 53, as indicated by the dot-and-dash line in FIG. 10, which is slightly greater than the labeled human body candidate area 52 in the frame image, over pixels thereof from left to right along successive horizontal lines, and downwardly across the horizontal lines. If the human body comparison feature extractor 31 detects successive pixels, each having the level "0" representing a dark area, then the human body comparison feature extractor 31 judges that the scanned area is a boundary between the human body candidate 4 and the road surface 51, and regards the boundary as a lower end OBb of the target object.

If the boundary between the human body candidate 4 and the road surface 51 cannot be judged clearly in the binarized images, such as when the legs of the target object are covered with slacks or when the target object is wearing shoes, then the human body comparison feature extractor 31 judges the boundary between the human body candidate 4 and the road surface 51 from grayscale images.

For judging the boundary between the human body candidate 4 and the road surface 51 from grayscale images, the human body comparison feature extractor 31 may determine the average value and luminance variance of luminance levels of the pixels of the mask area 53, and calculate the average value and luminance variance of luminance levels in each small area representing a group of rectangular pixels from left to right along successive horizontal lines, and downwardly across the horizontal lines in the mask area 53. If the human body comparison feature extractor 31 detects a succession of small areas with a low luminance variance, then the human body comparison feature extractor 31 regards the detected succession of small areas as a lower end OBb of the target object.

In step S4b, the human body comparison feature extractor 31 scans the mask area 53 over pixels thereof from left to right along successive horizontal lines, and upwardly across the horizontal lines from the lower end OBb of the target object. If the human body comparison feature extractor 31 detects a zone across which a horizontal edge 54 of luminance changes vertically, i.e., a zone represented by a succession of pairs of values "1" and "0", then the human body comparison feature extractor 31 judges the detected zone as an upper end OBt of the target object, which represents a boundary between the human body candidate 4 and background.

The size of the stature h of the human body candidate 4, which is represented by the number n of pixels, is determined from the lower end OBb and the upper end OBt of the human body candidate 4 (target object).

In step S5, the head extractor 32 scans the target object as the human body candidate 4 in the binarized image from right to left along successive horizontal lines, and downwardly across the horizontal lines from the upper end OBt of the target object, and detects two vertical edges 56, 58, where the luminance levels change, as representing the head width hw in the binarized image. The head extractor 32 determines the size of the head width hw, which is represented by the number m of pixels. Since the head 62 of a human body is usually an area of the infrared image having the highest luminance level, the head 62 is represented by a succession of values "1", and the head extractor 32 can accurately detect the vertical edges 56, 58 of the head 62.

In step S6, the size-in-real-space estimator 34 initially calculates the ratio Ri of the stature h and the head width hw of the human body candidate 4 in the image (Ri=h/hw=n/m). If each of the pixels is not of a square shape, then the pixels should be standardized in advance to be made square in shape. Then, the size-in-real-space estimator 34 refers to the characteristics Cr of the ratio R shown in FIG. 8, or to the map 60 shown in FIG. 7, in order to estimate (determine) a stature HT in real space (i.e., size as the stature of the human body in real space) at the time that the ratio R is the calculated ratio Ri (R=Ri). For estimating the stature HT in real space, the size-in-real-space estimator 34 does not refer to age.

In step S7, based on the stature HT in real space, the stature h in the image (length=number of pixels×length of each pixel) and the focal length F, the distance calculator 36 calculates the distance Zr up to the human body candidate in real space according to the following equation (3), which is similar to the aforementioned equation (1):

$$Zr=HT \times F/h \qquad (3)$$

Figure 11:
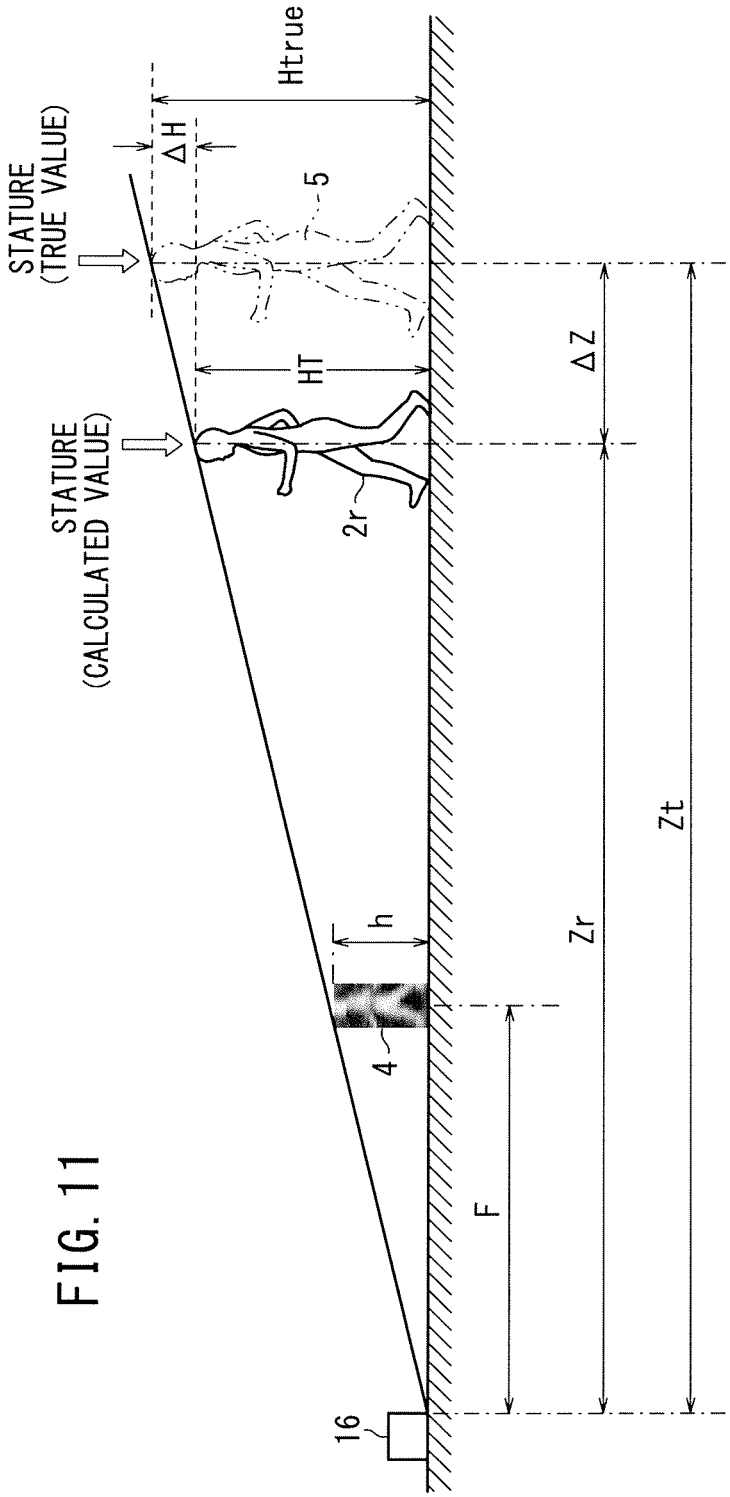
FIG. 11 is a diagram illustrating calculation of distance according to the embodiment.
Figure 15:
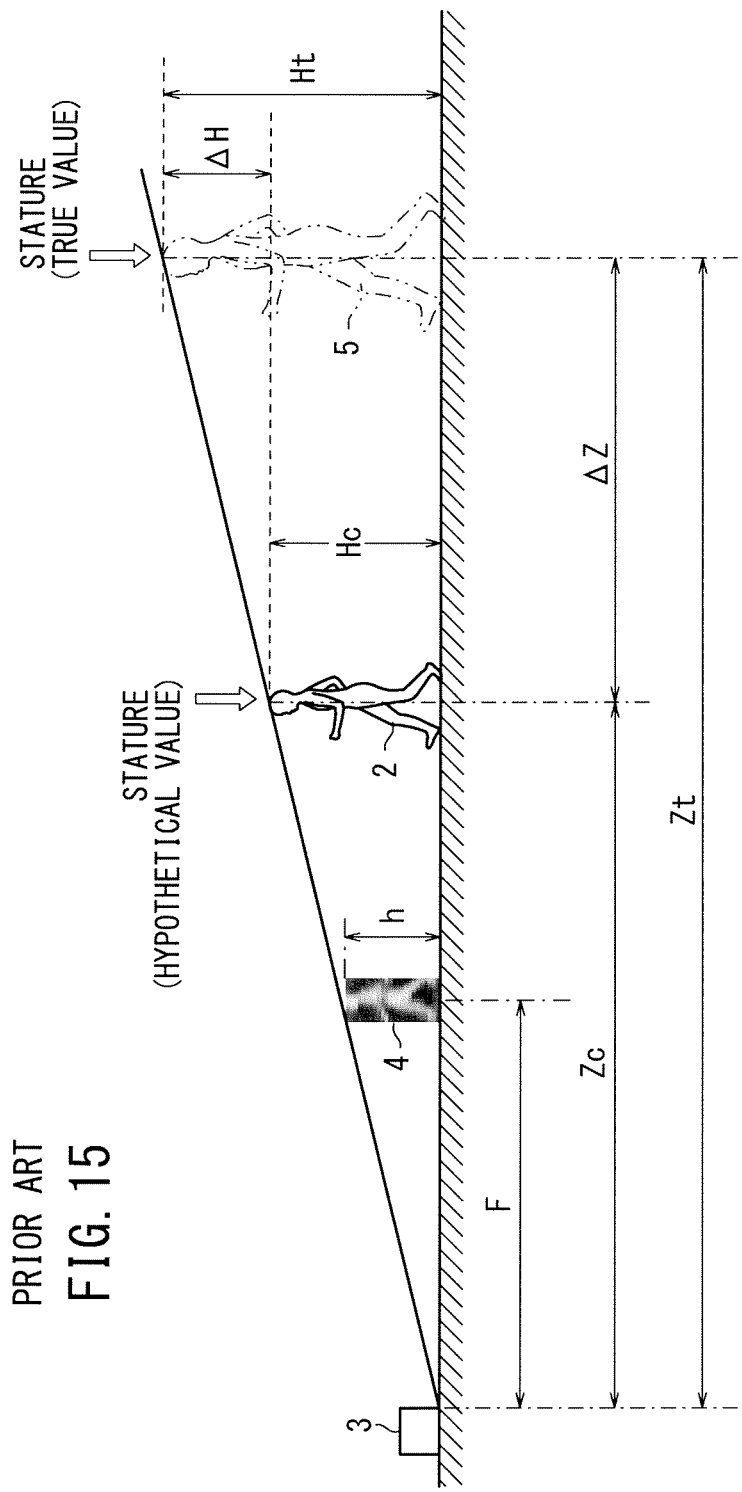
FIG. 15 is a diagram illustrating calculation of distance according to the background art.

The distance Zr is calculated on the basis of the ratio R of the head width, which is a substantially fixed value for people who are 4 years of age or older regardless of actual age, as shown in FIG. 8, and stature, which varies with age until the late teens (Japanese average stature values: 104.8 cm for those who are 4 years of age, 170.5 cm for those who are 20 to 24 years of age, and 158.6 cm for those who are 70 to 79 years of age), as compared with a hypothetical value of constant stature Hc (e.g., the distance Zc determined as 170 cm), as described above according to the background art with reference to FIG. 15. Therefore, as shown in FIG. 11, the distance error ΔZ is extremely small. The error ΔH, which is caused upon calculation of the stature, is also extremely small compared with the true stature Htrue, which would be at the distance Zt, wherein Zt =Zr +ΔZ.

In step S8, the image processing unit 14 detects a moving object having a high temperature as a target object, from the grayscale image and the binarized image that are obtained per frame over time, and detects a moving vector (speed and direction) of the moving object. In step S8, the image processing unit 14 also decides whether there is a likelihood for the vehicle 12 to come into contact with the target object, the distance Zr, which has been calculated by the distance calculator 36 of the vehicle 12 based on the manipulative variable Br, the vehicle speed Vs, and the yaw rate Yr, which are output respectively from the brake sensor 20, the vehicle speed sensor 18, and the yaw rate sensor 22, and the distance Zr up to the target object as calculated in step S7. If the image processing unit 14 decides that there is a possibility for the vehicle 12 to come into contact with the target object, then the image processing unit 14 displays a grayscale image of the target object (e.g., a pedestrian) on the HUD 26a, and issues a warning through the speaker 24 (notifying unit), thereby notifying the driver of the vehicle 12 and prompting the driver to avoid contact with the target object.

As described above, when the target object distance measuring apparatus 50 including the human body detector according to the above first inventive example detects a human body based on an image acquired by the single infrared camera 16, which serves as an image capturing device (the present invention may also employ an ordinary video camera for capturing images in a visible range), the human body candidate area extractor 30 extracts a human body candidate area 52 from the image (binarized image and/or grayscale image). The head extractor 32 of the human body reference feature extractor 33 extracts a head 62 from the extracted human body candidate area 52 based on a temperature pattern that is unique to the head, the surface temperature of which is particularly high. The human body comparison feature extractor 31 extracts at least one of human body features, including stature (stature shown in FIG. 1A), total width (shoulder width shown in FIG. 1A), the torso (upper limb length shown in FIG. 1A), the arm (arm length), the leg (inside leg length shown in FIG. 1A), as a human body comparison feature (stature in the case of the first inventive example). The size-in-real-space estimator 34 refers to the map 60, etc., based on the ratio R (R=stature/head in the first inventive example) of the size of the head extracted by the head extractor 32 (head width in the first inventive example), and the size of the at least one of human body features (stature in the first inventive example), and estimates the size in real space of the human body candidate 4 in the image (the stature HT, as shown in FIGS. 7, 8 and 11, in the first inventive example). The ratio may be a ratio of the head (human body reference feature) and the upper limb length (human body comparison feature), the ratio of the head (human body reference feature) and the inside leg length (human body comparison feature), or the like, rather than the ratio R of the head (reference feature) and the stature (comparison feature).

The distance calculator 36 can calculate the distance from the position of the infrared camera 16, which serves as an image capturing device, to the human body candidate 2 in real space according to the above equation (3), based on the estimated height HT as the size in real space, and the stature h as the size of the human body candidate area 52 in the image.

Second Inventive Example

FIG. 12 is a table showing a map (table) 80 of calculated ratios R' (shoulder widths/statures) according to a second inventive example, based on ages, statures (average values), and shoulder widths (average values), which are extracted from the Japanese body frame data shown in FIGS. 1A, 1B, 1C and 2, and the infant body frame data shown in FIGS. 3A, 3B, 3C and 4.

Figure 13:
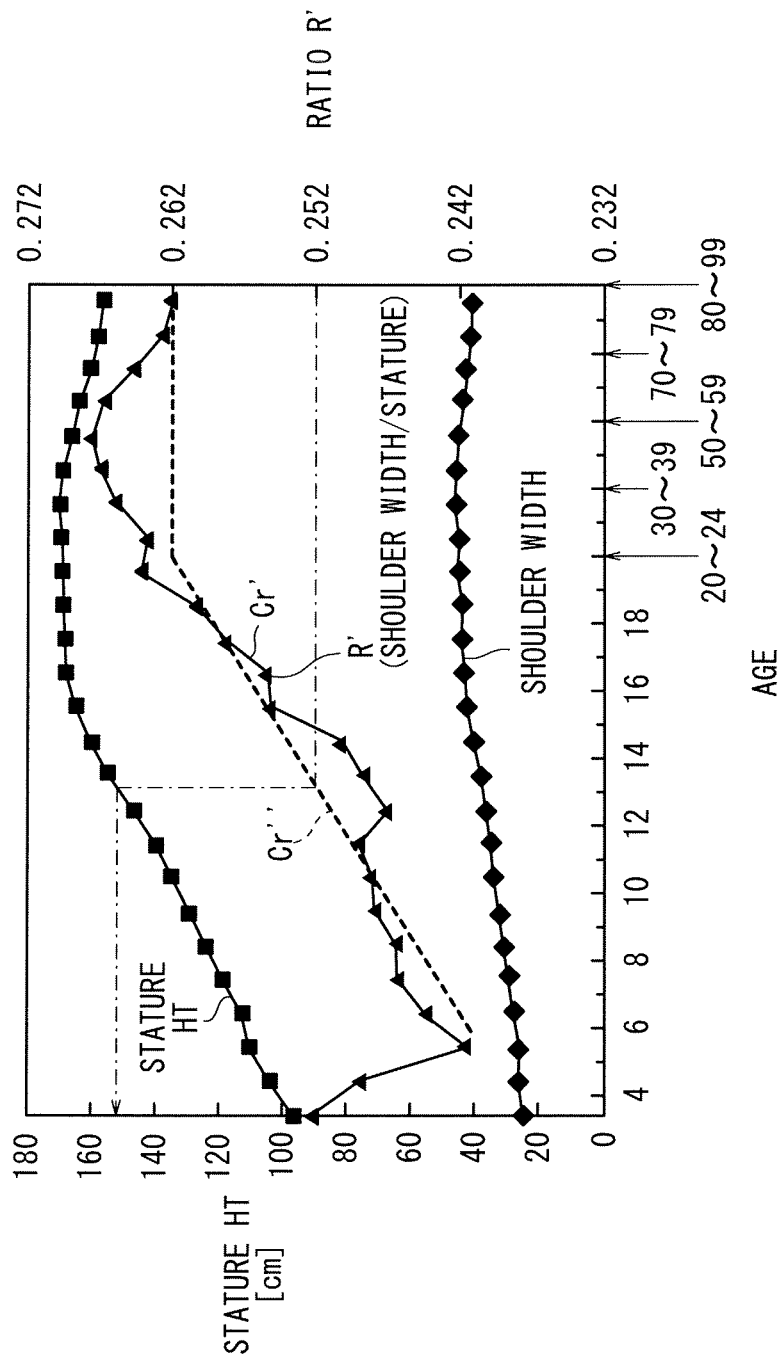
FIG. 13 is a graph showing stature, head width, and the ratio (stature/head width) thereof, of people ranging from 4 years of age to 99 years of age.

FIG. 13 is a graph showing statures, shoulder widths, and ratios R' (shoulder width/stature) according to the second inventive example, plotted for people ranging from 4 years of age to 99 years of age. It should be noted in particular that the characteristics Cr' of the ratio R' (shoulder width/stature) change generally in proportion to stature for people who are 5 years of age or older.

The second inventive example operates generally in accordance with the flowchart shown in FIG. 9. The operation sequence remains the same in steps S1 through S4. In step S4, the size (represented by the number n of pixels) of the stature h of the human body candidate 4 in the image is determined from the lower end OBb and the upper end OBt of the human body candidate 4 (target object).

Figure 14:
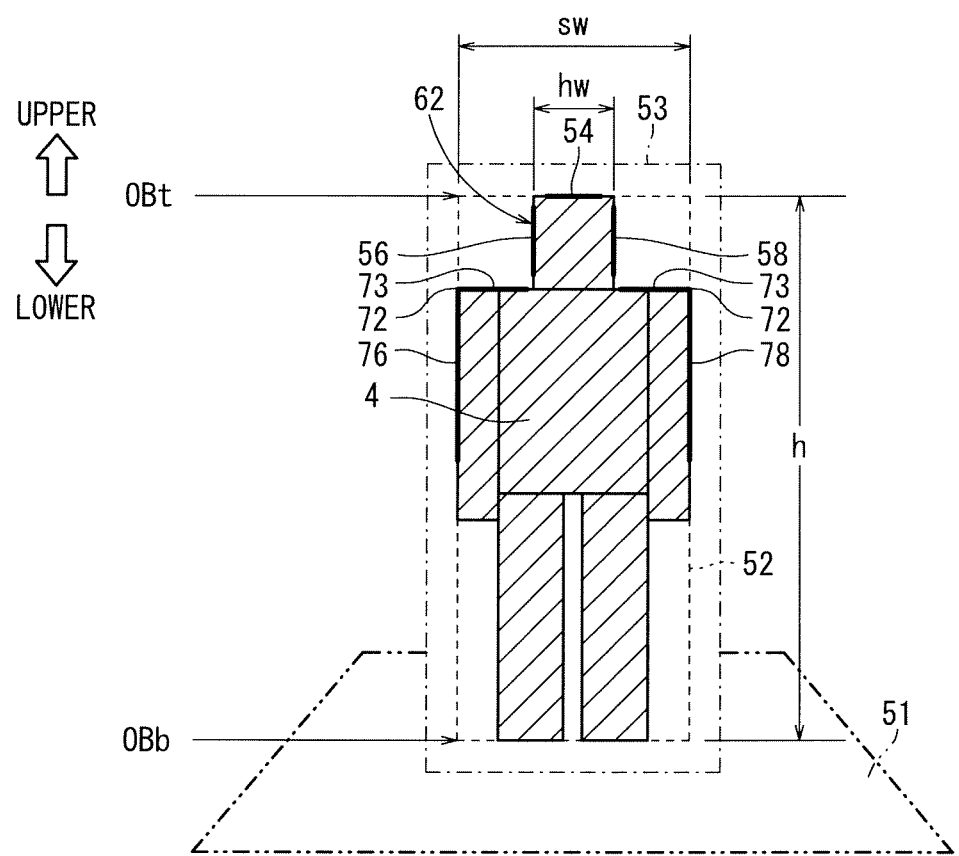
FIG. 14 is a diagram of an image used in describing an operation sequence according to a second inventive example.

In step S5', which replaces step S5, as shown in FIG. 14, the shoulder extractor 37 scans the target object as the human body candidate 4 in the binarized image, from right to left along successive horizontal lines, and downwardly across the horizontal lines from the upper end OBt of the target object, and detects two vertical edges 76, 78 where the luminance levels change as representing the shoulder width sw of shoulders 72, 73, which is the total width (maximum width) in the image. The shoulder extractor 37 determines the size (represented by the number p of pixels) of the shoulder width sw. Since the shoulder width sw of the shoulders 72, 73 is an area of the infrared image having the highest luminance level when the shoulders 72, 73 are exposed, e.g., when the target object is wearing sleeveless clothes, the shoulder width sw is represented by a succession of values "1". The shoulder extractor 37 can accurately detect the vertical edges 76, 78 of the shoulders 72, 73.

Even if the target object is wearing a T-shirt or a short-sleeved shirt as a top, then the shoulder extractor 37 can also accurately detect the outer sides of the arms near the arm joints as the vertical edges 76, 78 of the shoulders 72, 73. Therefore, the second inventive example applies in cases where the target object is wearing light clothes, or on hot days such as in the summer.

In step S6, the size-in-real-space estimator 34 calculates a ratio Ri' [(Ri'=(h/sw)=(n/p)] of the stature r and the shoulder width sw of the human body candidate 4 in the image. If each pixel is not of a square shape, then the pixels should be standardized in advance to be square in shape.

Then, the size-in-real-space estimator 34 refers to the characteristics Cr' of the ratio R' shown in FIG. 13, or to the map 80 shown in FIG. 12, in order to estimate (determine) a stature HT in real space (size as the stature of the human body in real space) at the time that the ratio R' equals the calculated ratio Ri' (R'=Ri'). For estimating the stature HT in real space, the size-in-real-space estimator 34 does not refer to age.

In step S7, the distance calculator 36 calculates the distance Zr up to the human body candidate in real space according to the above equation (3), based on the stature HT in real space that was estimated in step S6, the stature h in the image (length=the number of pixels×pixel length), and the focal length F.

The calculated distance Zr suffers from a smaller distance error ΔZ than a hypothetical value of constant stature Hc, which was described above according to the background art with reference to FIG. 15, e.g., the distance Zc determined as 170 cm. Therefore, the error ΔH, which is caused during calculation of stature, is also smaller than with the true stature Htrue.

In the second inventive example, the characteristics Cr' of the ratio R' may be approximated by linear characteristics Cr", for people ranging from 5 years of age to 20 years of age. Further, the stature HT in real space, which corresponds to the calculated ratio Ri', may be determined by referring to the linear characteristics Cr". For example, when R'=Ri'=0.252, the stature HT is estimated (calculated) as HT≈152 cm.

If the calculated ratio Ri' is Ri'>0.262, then the stature HT in real space may be determined based on R'=0.262, as indicated by the horizontal portion of the characteristics Cr", for people ranging from 20 years of age to 99 years of age. In other words, the ratio R' column shown in FIG. 12 may be rewritten as characteristics Cr" indicated by the broken lines.

The maximum value of the ratio R' is set to R'=0.262, because the ratio R' at an age of 99 years is of a value in excess of 0.262.

In view of the fact that preschool children rarely walk alone on roads at night, the second inventive example is sufficiently advantageous in terms of practical use thereof, even if the distance Zr up to the human body candidate is calculated based on the characteristics Cr' or Cr".

The present invention is not limited to the above embodiments, and various alternative arrangements may be adopted based on the disclosure of the present description.

For example, according to the first inventive example, the stature HT is estimated when the head is detected, based on the ratio R of the head and the stature of the body frame data, whereas according to the second inventive example, the stature HT is estimated when the shoulders are detected, based on the ratio R' of the shoulder width and the stature. However, when other areas, such as the torso (upper limb length shown in FIG. 1A), the arm (arm length), the leg (inside leg length shown in FIG. 1A), etc., are detected, i.e., when a plurality of areas are detected, as described above, a judgment may be made that the reliability of a human body candidate is high. If a plurality of human body candidates are detected, the distance up to the human body candidate can be calculated with high reliability.

In the above embodiments, the human features include a total height, a total width, a torso, an arm, a leg, and a head. However, the distance may be calculated based on other areas or human features, e.g., the size of a foot, the length of a leg part below-the-knee, the size of a hand, etc.

In the above embodiment, the distance is calculated using a monocular image capturing device in the form of a single infrared camera (or an ordinary video camera). However, a pantoscopic image capturing device (stereoscopic camera) having two infrared cameras (or two ordinary video cameras) may be used. Even if a monocular image capturing device is used, since the distance can be calculated from an image in a single frame, the target object can quickly be detected.

The invention claimed is:

1. A target object distance measuring apparatus including a human body detector for detecting a human body based on an image acquired by an image capturing device, the target object distance measuring apparatus comprising:
   a human body candidate area extractor for extracting a human body candidate area from the image;
   a reference feature extractor for extracting, as a reference feature from the extracted human body candidate area, a predetermined one of human features including a total height, a torso, an arm, a leg, and a head;
   a comparison feature extractor for extracting, as a comparison feature from the extracted human body candidate area, one of the human features including the total height, the torso, the arm, the leg, and the head, except for the reference feature;
   a size-in-real-space estimator for estimating the size in real space of a human body candidate in the image, based on a ratio of the size of the reference feature and the size of the comparison feature; and
   a distance calculator for calculating the distance from the image capturing device to the human body candidate in the real space, based on the estimated size in the real space of the human body candidate and the size of the human body candidate in the image.

2. The target object distance measuring apparatus according to claim 1, wherein the reference feature is the head and the comparison feature is the total height.

3. A vehicle incorporating the target object distance measuring apparatus according to claim 1, wherein the vehicle includes a notifying unit for notifying a driver of the vehicle when the human body detector detects a human body.

* * * * *